US005776273A

United States Patent [19]

Takeuchi et al.

[11] Patent Number: 5,776,273

[45] Date of Patent: Jul. 7, 1998

[54] METHOD FOR LINING WITH POWDER

[75] Inventors: Norio Takeuchi; Masaki Morotomi, both of Yokohama; Toshinori Moriga, Tokyo; Ken Takenouchi; Seishichi Kobayashi, both of Yokohama, all of Japan

[73] Assignee: Toyo Seikan Kaisha, Ltd., Tokyo, Japan

[21] Appl. No.: 543,595

[22] Filed: Oct. 16, 1995

[30] Foreign Application Priority Data

Oct. 14, 1994 [JP] Japan .................................... 6-249633

[51] Int. Cl.[6] .............................. B27N 3/00; B32B 17/00

[52] U.S. Cl. ........................ 156/62.2; 156/73.6; 156/155; 427/180; 427/184

[58] Field of Search ................................ 156/62.2, 73.6, 156/155, 297; 427/180, 203, 195, 184, 186

[56] References Cited

U.S. PATENT DOCUMENTS

| | | | |
|---|---|---|---|
| 4,212,691 | 7/1980 | Potosky et al. | 156/79 |
| 4,529,625 | 7/1985 | Reidenbach et al. | 427/186 |

FOREIGN PATENT DOCUMENTS

| | | |
|---|---|---|
| 6-18716 | 2/1987 | Japan . |
| 350445 | 6/1931 | United Kingdom . |
| 843452 | 8/1960 | United Kingdom . |
| 1225501 | 3/1971 | United Kingdom . |
| 1299480 | 12/1972 | United Kingdom . |
| 1377022 | 12/1974 | United Kingdom . |
| 2025266 | 1/1980 | United Kingdom . |

OTHER PUBLICATIONS

European patent Search Report conducted by R E Hardy 00 Jan. 25, 1996 for App. # GB 9,521,050, 1 page.

*Primary Examiner*—Donald Loney
*Attorney, Agent, or Firm*—Morrison Law Firm

[57] ABSTRACT

An object, such as a container cover, is lined on a predefined area of the object by depositing powder on the predefined area. The lining material is formed into a non-spherical powder having a resting angle of 40 degrees or greater. The powder is deposited by fluidizing the powder in a feeder using vibration and conveying the powder through a nozzle to the predefined area. The powder layer deposited on the object is pressed with a molding element to form a lining layer having the predefined shape. The lining thus formed has a predefined thickness distribution and shape with good tightening and sealing properties and corrosion resistance. In addition, no environmentally unsafe processes are required for the precise deposition of powder.

84 Claims, 5 Drawing Sheets

METHOD FOR LINING WITH POWDER

BACKGROUND OF THE INVENTION

The present invention relates to a method for using a powder to line a base object at a prescribed position in a prescribed shape. More specifically, the present invention relates to a method for using a powder to line a base object at a prescribed position in a prescribed shape wherein the powder has a large angle of rest. Still more specifically, the present invention relates to a method for lining wherein lining covers having desired properties are produced efficiently without generating environmental pollution, unwanted contamination, etc.

Nozzles of aerosol cans are attached to a lining cover, referred to as a mounting cup. In a mounting cup, a flange is formed on the perimeter of the metal cover, and a lining material is lined in the grooves of the flange.

Conventionally, rubber has been used as the lining material. Rubber is dissolved in an aromatic solvent, and this solution is spin-coated to form a lining layer. However, this method results in splattering of the solvent during application and is therefore not desirable in terms of environmental hygiene. Also, experienced workers are needed to form a lining layer in a prescribed shape. Furthermore, a great deal of time is consumed in the process of drying the lining layer, which adversely affects production.

Lining methods employing lining material that are applied as powders are also known. Widely known methods include thermal spraying, fluid immersion, and powder spraying.

In thermal spraying, plastic powder is passed through a high-temperature flame at high speeds such that the powder is partially melted. The partially melted powder is blown by compressed air onto the surface to be lined. It is desirable to preheat the base object to be lined to ameliorate adhesion of the material.

In the fluid immersion method, plastic powder that is readily fluidized is used. A fluid layer of the plastic powder is formed using flowing air or nitrogen gas. The base object to be lined is preheated and placed in this fluidized layer.

In the powder spraying method, the base object to be lined is preheated in a heating furnace. Plastic powder is blown on the base object using a spray or an electrostatic spraying device. The sprayed powder melts to form the lining.

The powder lining methods described above have the advantage of not polluting the work environment because the lining material can be applied to the base object to be covered without using solvents. However, while these methods can be used to line the entire object, they are not suited for applications where the application of lining materials is desired to be limited to prescribed areas of a base object. When such methods are used for lining prescribed areas, splattering is unavoidable. Furthermore, since the conventional lining methods require preheating of the base object, the splattered resin powder will inevitably melt and adhere to areas outside the prescribed lining areas.

The lining layer formed using conventional powder lining methods is flat. It is almost impossible to use these methods when a lining having a prescribed profile or thickness is desired, for example, to be used for sealing and other purposes. Also, the linings resulting from powder methods are generally thin. It is possible to form lining that is thicker, but this tends to produce pinholes, pits, and other undesirable features in the resulting lining layer.

For these reasons, it is difficult for conventional powder lining methods to be used in applications such as the production of mounting cups in aerosol cans, where linings must be formed with prescribed distributions in shape and thickness and limited in area to the flange, used for seaming and tightening.

OBJECTS AND SUMMARY OF THE INVENTION

It is an object of the present invention to provide a method capable of forming linings having prescribed thickness profiles and areal distributions.

It is another object of the present invention to provide a powder lining-forming method that can achieve the above-stated objects.

It is another object of the present invention to provide a method of powder-deposition forming of a lining material that can restrict the application of powder to prescribed areas of an object.

Still another object of the present invention is to provide a lining method that avoids generation of environmental pollution.

Still another object of the present invention is to provide a lining method that permits efficient production of a lining cover that resists corrosion and that has good tightening and sealing properties.

Briefly, an object, such as a container cover, is lined on a predefined area of the object by depositing powder on the predefined area. The lining material is formed into a non-spherical powder having a resting angle of 40 degrees. The powder is deposited by fluidizing the powder in a feeder using vibration and conveying the powder through a nozzle to the predefined area. The powder layer deposited on the object is pressed with a molding element to form a lining layer having the predefined shape. The lining thus formed has a predefined thickness distribution and shape with good tightening and sealing properties and corrosion resistance. In addition, no environmentally unsafe processes are required for the precise deposition of powder.

The present invention provides a method for lining a prescribed area on a base object with powder wherein: the powder is non-spherical and has a resting angle of 40 degrees or greater; the powder is stored in a feeding mechanism comprising a feed nozzle and a vibrating mechanism; the vibrations of the feeding mechanism cause the powder to flow, and a powder layer is formed on a prescribed area of the base object; and the powder layer is pressed with a molding member to form a lining layer having a prescribed shape.

According to one embodiment, the present invention allows predetermined amounts of lining material powder to be fed by controlling the interval of vibrations of a feeding mechanism.

The powder can be any powder conventionally used in powder lining that can be fused integrally. In particular, irregularly shaped resin, especially thermoplastic resin is optimal. Powder diameter of between 50 and 300 micrometers would be desirable.

According to one embodiment, the feed mechanism includes a feed nozzle that has a funnel-shaped internal surface. A cylinder-shaped tip with a diameter that between 2 and 40 times larger than the powder particle diameter is used. A diameter of between 10 and 30 times the powder is optimal. An inclined portion having an incline of between 30 and 70 degrees is desirable, and an incline of between 40 and 60 degrees being optimal.

It is desirable for the vibrations applied to the feeding mechanism to be between 5 and 1000 Hz, and between 5 and 500 Hz would be especially desirable. An amplitude of between 0.1 and 3 mm would be desirable, and an amplitude of between 0.1 and 1 mm being optimal. It is advantageous for the vibrations applied to the feeding mechanism to have the same direction as the feeding direction (downward) of the powder.

The present invention is effective in applications where a lining is to be formed for a sealing portion of a base object. In particular, the present invention is especially suited for metallic covers having a flange used for tightening, where thermoplastic resin powder is applied to the groove areas of the flange.

In the present invention, non-spherical powder having a resting angle of 40 degrees or more is used. This type of powder is used for its moldability. Moldability in this case refers to the characteristic wherein a powder layer can be pressed on by the surface of a molding member, and when the molding pressure is released the molded shape can be maintained. Spherical powder has high fluidity, and powder with a low resting angle has high fluidity. In conventional powder linings, spherical powder having a low resting angle had been used because of the corresponding fluidity. However, in the present invention a powder having low fluidity is used in consideration of the moldability of the powder.

Using a powder having a low fluidity brings up the issue of how to feed the powder to a prescribed area. In the present invention, this issue is resolved by: storing the powder in a feeding mechanism with a feed nozzle and a vibrating mechanism; the vibrations from the feeding mechanism makes the powder fluid and feeds the powder to a predefined area of the base object. The present invention uses a non-spherical powder that has a large resting angle, and therefore a low fluidity. However, the application of vibration can make the powder sufficiently fluid to convey predictably. This allows a prescribed amount of powder to be fed to a target area of the base object. In conventional lining methods, a gas is used to make the powder fluid. However, in the present invention the use of gas for fluidity is avoided, and instead the powder is made fluid through vibrations. This makes it possible to smoothly feed powder to a prescribed area on the base object while avoiding the scattering of the powder which accompanies the use of gas for fluidity.

Next, a molding member is used to press against the powder-filled layer on the base object in order to form the lining layer into a prescribed shape. The fact that the powder in this invention has a resting angle of 40 degrees or more signifies that the powder will maintain an incline angle of 40 degrees or more from the horizontal plane even if it is free and loose. Thus, the powder tends not to crumble or flatten after it is deposited. Also, because of the non-spherical shape of the powder particles, the particles can engage more effectively with each other. Thus, when the powder-filled layer is pressed into shape, the prescribed lining shape can be obtained easily without crumbling. The resulting powder lining layer with a prescribed shape can then be melted so that the particles can melt integrally with each other, forming the final lining layer.

Also, according to the present invention the powder is made fluid by vibration and when the vibration stops, the flow of the particles stops and the feeding stops. When the vibration begins again, the powder flows and feeding begins. When the powder is flowing, the amount of flow per unit of time is constant. Therefore, it is possible to perform intermittent feeding of fixed amounts by starting and stopping the vibrations of the feeding mechanism.

Also, according to the present invention, the particle diameter and the amount of feeding can be adjusted so that the thickness of the lining layer can be freely adjusted. In particular, since relatively large particles with diameters of between 100 and 500 micrometers can be easily used, a thick lining can be easily formed. Thus, when the powder-filled layer is molded, a lining layer can be formed without surface defects such as pinholes. The resulting lining layer will have good sealing properties and corrosion resistance.

A smooth feeding operation is obtained with a feed nozzle that has a funnel shaped inside. The diameter of the cylindrical tip affects the uniformity of the flow when vibration is applied, as well as the manner in which the flow stops when vibration is stopped. A diameter of between 2 and 40 times the diameter of the powder particles would be desirable. In particular, a diameter of between 10 and 30 times would be especially desirable. The incline angle of the funnel shaped area may differ somewhat according to the resting angle of the powder, but should be between 30 and 70 degrees so that when vibrations are started and stopped, stable intermittent feeding of fixed amounts is possible. In particular, a range of between 40 and 60 degrees would be especially desirable. If the diameter of the cylindrical tip is smaller than this range or if the incline angle of the funnel-shaped area is smaller than the resting angle of the powder, a constant feeding rate is difficult to achieve. If the diameter of the cylindrical tip is greater than this range or if the incline angle of the funnel-shaped area is greater than the resting angle of the powder, powder continues to fall even if there is no vibration, thus resulting in scattering of the powder.

The vibrations applied to the feeding mechanism directly affect the fluidity of the powder particles. It would be desirable for the frequency of the vibration to be between 5 and 1000 Hz, and it would be especially desirable for the range to be between 5 and 500 Hz. It is desirable for the amplitude to be between 0.01 and 3 mm, and optimally between 0.1 and 1 mm. If the frequency or the amplitude is lower than the ranges above, a constant feeding rate has been found to be difficult to achieve. If the frequency or amplitude is higher than the ranges above, energy is wasted.

The present invention can be used for forming a powder lining on various types of base objects. In particular, the present invention is especially suited for applications requiring a very tight seal and corrosion resistance, such as a container cover, and especially a container cover where a thermoplastic resin powder is applied to the flange grooves on a metal cover.

According to an embodiment of the present invention, there is provided a lining method for lining a predefined surface area on a base object, including providing a lining material in the form a non-spherical powder with a resting angle of 40 degrees or greater, holding the powder in a container having a feed outlet, vibrating at least one of the feed outlet and the container at a frequency and amplitude such that the powder can flow by gravity through the feed outlet thereby feeding the powder, feeding at least a portion of the powder stored in the container onto the predefined surface area, and fixing the powder fed onto the predefined area to form a lining.

According to another embodiment of the present invention, there is provided a lining method for lining a predefined surface area on a base object, including providing a lining material in the form a non-spherical powder with a resting angle of 40 degrees or greater, providing a conveyor with a surface having a portion that is oblique to both a direction of gravitational force and a direction perpendicular to the direction of gravitational force, supplying the powder onto the surface of the conveyor, vibrating the surface of the conveyor sufficiently to fluidize the powder such that the powder moves toward a feed outlet portion of the conveyor, feeding the powder onto the predefined surface area, and fixing the powder fed onto the predefined area to form a lining.

According to still another embodiment of the present invention, there is provided a lining method for lining a predefined surface area on a base object, including providing a lining material in the form a non-spherical powder with a resting angle of 40 degrees or greater, providing a conveyor with a surface having a portion that is oblique to both a direction of gravitational force and a direction perpendicular to the direction of gravitational force, supplying the powder onto the surface of the conveyor, vibrating the surface of the conveyor sufficiently to fluidize the powder such that the powder moves toward a feed outlet portion of the conveyor, guiding the powder moving toward the feed outlet to a portion of the conveyor surface shaped to limit a spread of the powder fed from the surface beyond the predefined area, whereby the powder is fed onto the predefined surface area, and fixing the powder fed onto the predefined area to form a lining.

According to still another embodiment of the present invention, there is provided a lining method for lining a predefined surface area on a base object, including providing a lining material in the form a non-spherical powder with a resting angle of 40 degrees or greater, providing a conveyor with a surface having a portion that is oblique to both a direction of gravitational force and a direction perpendicular to the direction of gravitational force, supplying the powder onto the surface of the conveyor, vibrating the surface of the conveyor sufficiently to fluidize the powder such that the powder moves toward a feed outlet portion of the conveyor, guiding the powder moving toward the feed outlet to a portion of the conveyor surface shaped to limit a spread of the powder fed from the surface beyond the predefined area, whereby the powder is fed onto the predefined surface area, and heat-fixing and simultaneously molding the powder fed onto the predefined area to form a lining with a surface shaped by the molding.

According to an embodiment of the invention, a liner cover includes a metal cover having a tightening flange along its perimeter, a lining material lined on a groove of the flange, the lining material being formed by thermally molding a thermoplastic resin, the lining material being thinnest along an outer perimeter rim of the flange and being thicker toward a center of the groove, and the lining extending over an inner perimeter surface of the flange, with the inner perimeter surface being opposite an outer perimeter surface of the flange and extending over an opposite side from the groove.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
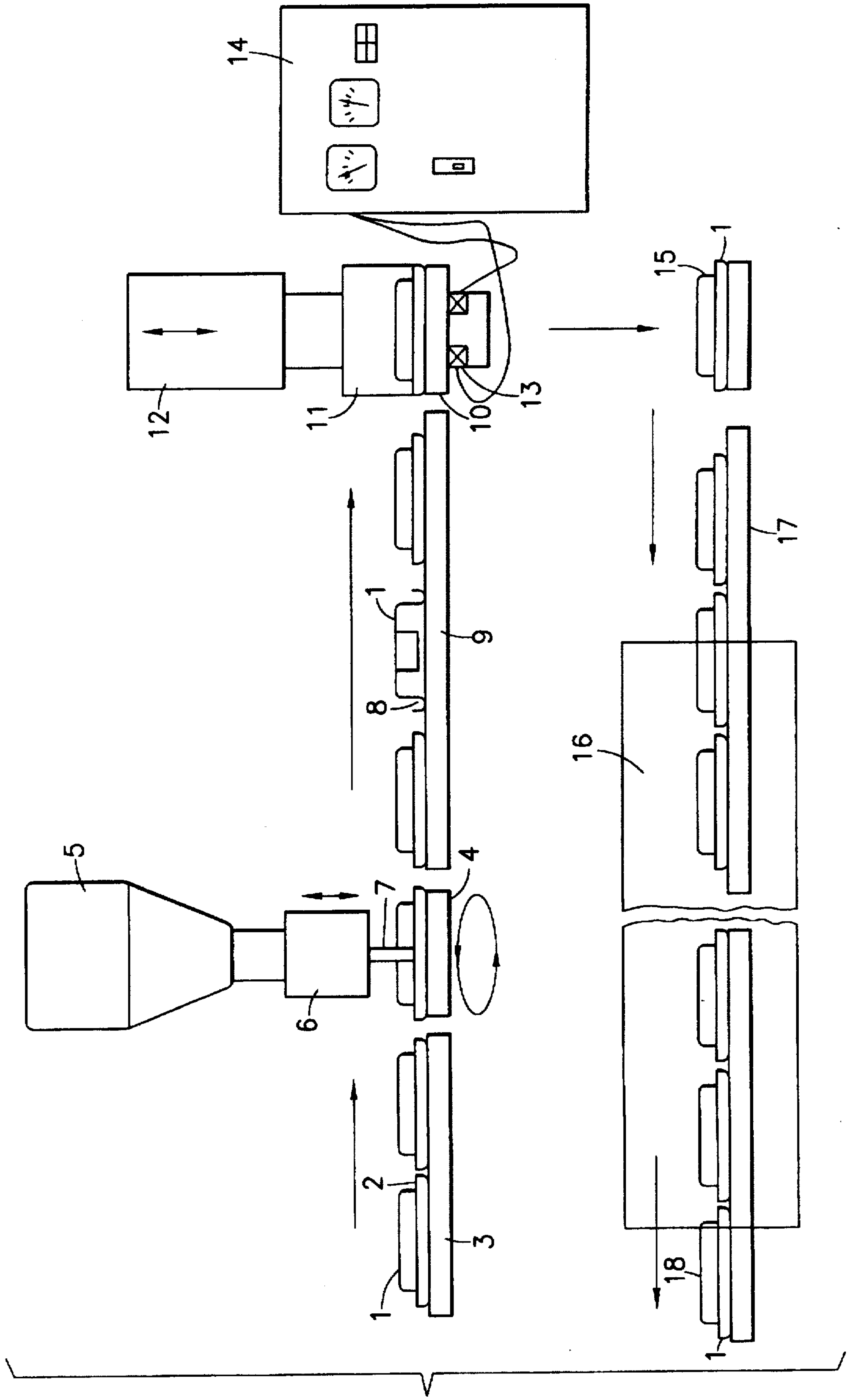
FIG. 1 is a side view of an production line for producing a lining according to an embodiment of the present invention.

Referring to FIG. 1, in an example of a lining method of the present invention, a lining cover 1 is formed on a base object. The base object is a metal cover having a tightening flange 2. Cover 1 is conveyed by a conveyor 3 through a feeding process stage A of a production line in an inverted position. The inverted position of cover 1 insures the grooves on flange 2 face upwardly. At the feeding process stage A, a rotating chuck 4 supports and rotates metal cover 1. A hopper 5 holding resin powder is located opposite rotating chuck 4. A vibrating mechanism 6 with a feed nozzle 7 conveys resin powder 8 to the metal cover 1. The vibrations feed resin powder 8 in fixed increments through nozzle 7.

After a prescribed amount of resin powder 8 has been fed onto metal cover 1, metal cover 1 is conveyed by a conveying mechanism 9 to a molding and heating process stage B of the production line. In molding and heating process stage B, a supporting base 10, of non-magnetic and non-conductive material, supports metal cover 1. A molding member 11 molds a layer formed in feeding process stage A of resin powder 8. A pressure mechanism 12 applies pressure to molding member 11. In the present example, a high-frequency induction heating coil 13, applies heat to metal cover 1 on supporting base 10, loosely fixing resin powder 8. A high-frequency power supply 14 supplies high-frequency current to high-frequency induction heating coil 13. First, resin powder 8 on the metal cover is pressed into a pre-defined shape with molding member 11. Then, a high-frequency current is supplied to high-frequency induction heating coil 13. Metal cover 1 heats, and resin powder 8 within it is loosely fixed into a pre-defined shape, fixed powder layer 15. Of course, this fixing procedure can be omitted in applications where high precision in the lining shape is not required or where powder resin 8 is adequately moldable.

Next, base object 1 (the metal cover), with fixed powder layer 15, fixed at heating process stage B, is conveyed to a fusing process stage C of the production line. At fusing process stage C, an oven 16 heats fixed powder layer 15. A conveying mechanism 17 conveys base object 1 through an oven 16. Fixed powder layer 15, which is loosely fixed, fuses integrally to form a lining layer 18 in the predefined shape. Once the fusing process is complete, base object 1 (the metal cover) is cooled and lining layer 18 hardened.

Figure 2:
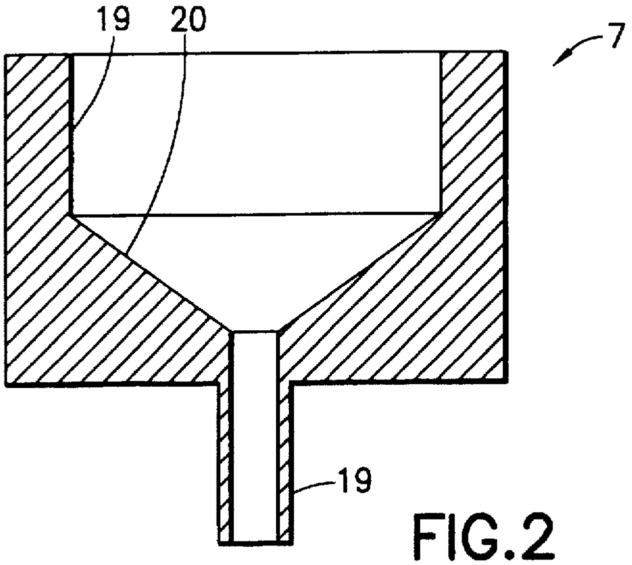
FIG. 2 is a cross-section a nozzle used in feeding powder according to an embodiment of the present invention.

Referring to FIG. 2, feed nozzle 7, which feeds resin powder 8, has a funnel-shaped internal surface with a cylindrical portion 19 attached to a base of a (inverted) cone-shaped portion 20. The apex of cone-shaped portion 20 communicates with a cylindrical orifice 21. As indicated, feed nozzle 7 is vibrated to feed resin powder 8. Resin powder 8 is of irregularly shaped particles which is difficult to feed. The funnel shape of the feed nozzle and the vibration promotes the smooth feeding of resin powder 8.

A taper angle ce of cone-shaped portion 20 and a diameter d of nozzle orifice 21 are selected from fixed optimal ranges. These ranges corresponds to the particle diameter and resting angle of the thermoplastic resin powder that is used. For example, for low-density polyethylene (LDPE) with a particle diameter of between 50 and 200 micrometers and a resting angle of between 50 and 60 degrees, it is desirable for diameter d to be between 2 and 3 mm and for taper angle alpha to be between 40 and 60degrees.

Nozzle 7 with vibrating mechanism 6 together form a vibrating feeder. With this vibrating feeder, it is possible to feed controlled quantities of powder. In addition to the configuration of nozzle 7, there are optimal ranges for the frequency and amplitude of vibrating mechanism 6. In the above example, it has been found to be advantageous for the frequency of vibration of vibrating mechanism 6 to be between 1 and 500 Hz with an amplitude in the range of 0.05 to 2 mm.

Figure 3A:
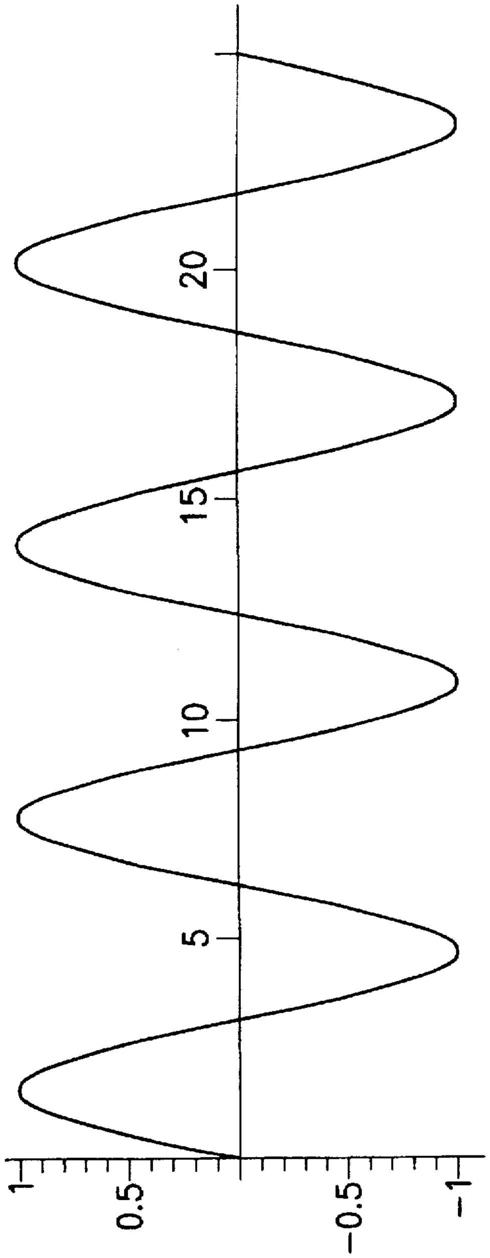
FIG. 3(A) is a graph indicating a waveform of a vibration applied to the nozzle of FIG. 2.
Figure 3B:
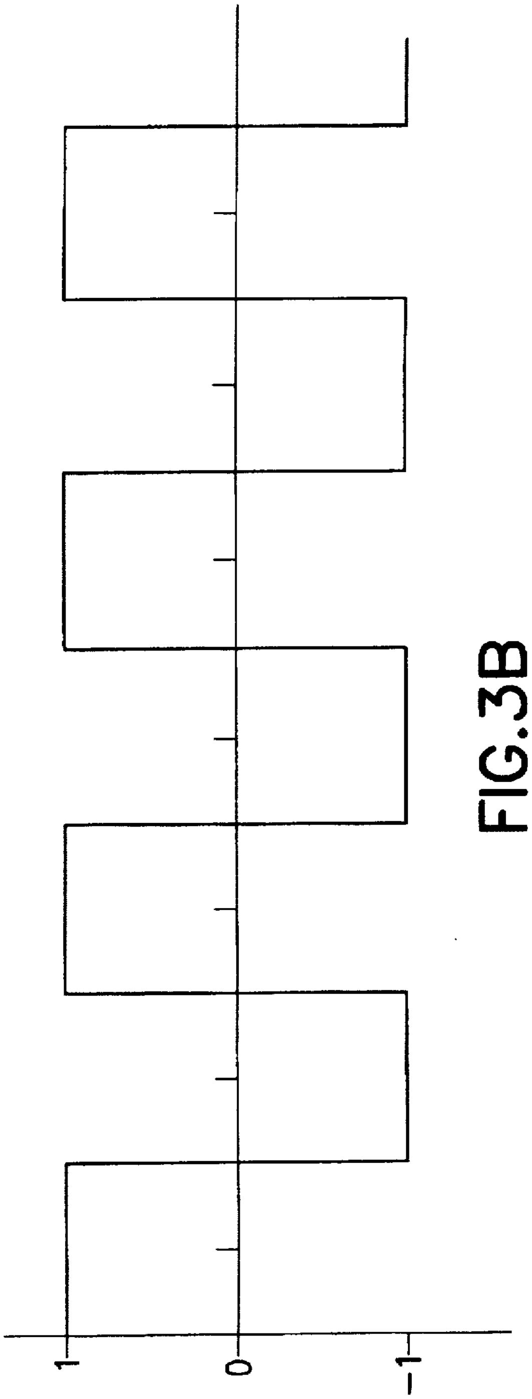
FIG. 3(B) is a graph indicating a waveform of a vibration applied to the nozzle of FIG. 2.

Referring to FIG. 3, examples of a vibration waveform applied by vibration mechanism 6 are shown. FIG. 3(A) and FIG. 3(B) signify a dynamic profile of displacement which the vibration provides to the feeder. The horizontal axis shows the time and the vertical axis shows the displacement of the feeder. The direction shown by the vertical axis may vary according to the actual vibrating direction. The amplitude is normalized by the actual amplitude of each vibration.

The ideal amount of thermoplastic resin powder 8 fed onto base element 1 varies according to factors such as the overall size of the lining portion. It has been found that for a mounting cup with a diameter of 24 mm, that it is desirable to feed a total mass of between 0.2 and 0.35 g per mounting cup. A range of between 0.25 and 0.3 g per piece has been found to be still more desirable.

The lining method of the present invention permits the feed amount of resin per cover to be increased or decreased easily. With the vibrating feeder of the present invention, the rate of resin flow during constant vibration is fixed. Thus, by controlling the duration of vibration of the vibrating feeder, it is possible to adjust the total mass of powder fed onto the target. The mass of resin fed can be controlled in other ways. It is also possible to place fixed quantities of powder in the feeder before initiating feeding and halting after all of the fixed quantity has been fed. It is also possible to weigh the powder during feeding and shut off feeding when the total amount fed reaches a desired point.

It has been found to be advantageous to feed resin powder onto base object 1 while rotating base object 1. This has been found to provide uniform application of resin to the lining portion of the base object, i.e., the groove of the curved flange of the metal cover. With the mounting cup described above, it has been found advantageous to rotate mounting cup 27 at a rate of 40 to 80 rpm, and ideally to rotate it at a rate of 50 to 70 rpm. If the rotation speed is too low, a uniform application of the resin powder in the circumferential direction is difficult. If the rotation speed is too high, significant dispersion of the resin powder occurs. A smooth, uniform application is made possible with the ranges described above.

It is also desirable to feed resin powder through more than one nozzle arranged on a circumference along the tightening flange. In this case, it is desirable to arrange the nozzles equally spaced on the circumference. In the case of the mounting cup, it is advantageous to have between 2 and 180 nozzles. Preferably, between 4 and 90 nozzles are used.

The nozzles can have any horizontal cross-sectional shape, such as a circular hole, a straight-line slit, a circular arc slit, or a spiral slit. Resin powder can be fed onto the cover while the cover is rotating or fixed.

Figure 4A:
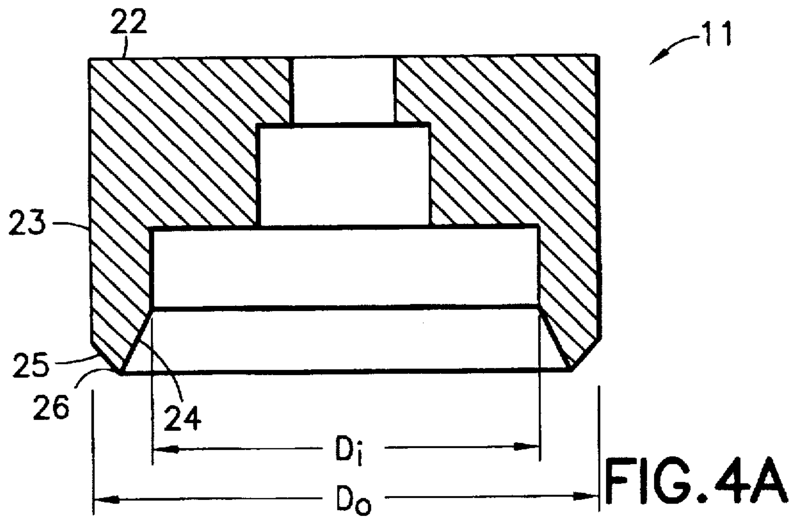
FIG. 4(A) is a cross-section of a molding tool used in a pressurizing and heating process according to an embodiment of the present invention.
Figure 4B:
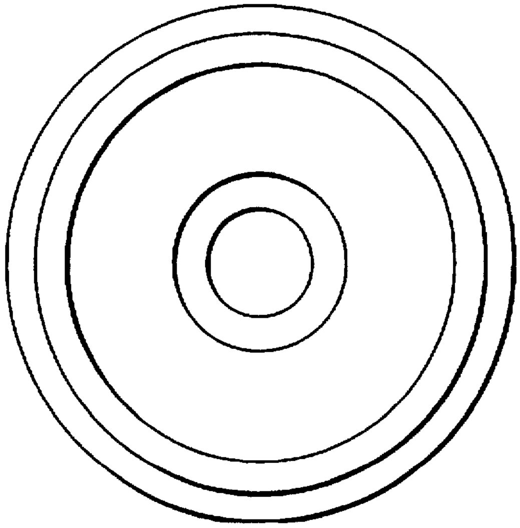
FIG. 4(B) is an axial view of the molding tool of FIG. 4*a*.
Figure 5:
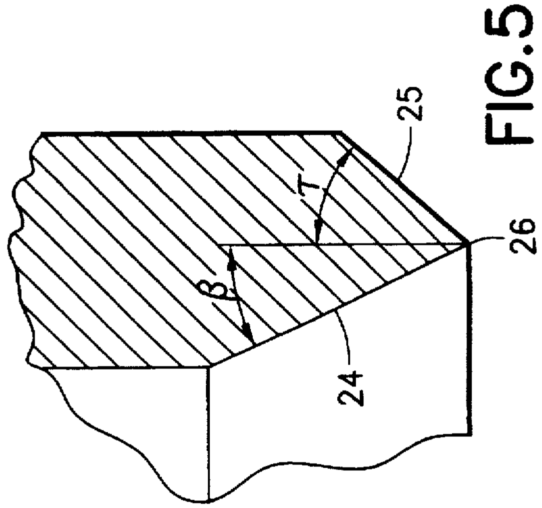
FIG. 5 is an enlarged radial cross-section of a tip of the molding tool of FIGS. 4*a* and 4*b*.

Referring to FIGS. 4 and 5, a tip of an embodiment of the molding member 11 used in the molding procedure has a plate-shaped base 22 with a ring 23 disposed below base 22. An active tip 26 at the lower end of ring 23 has an asymmetrical V-shaped profile comprising a longer inner side 24 and a shorter outer side 25.

Figure 6:
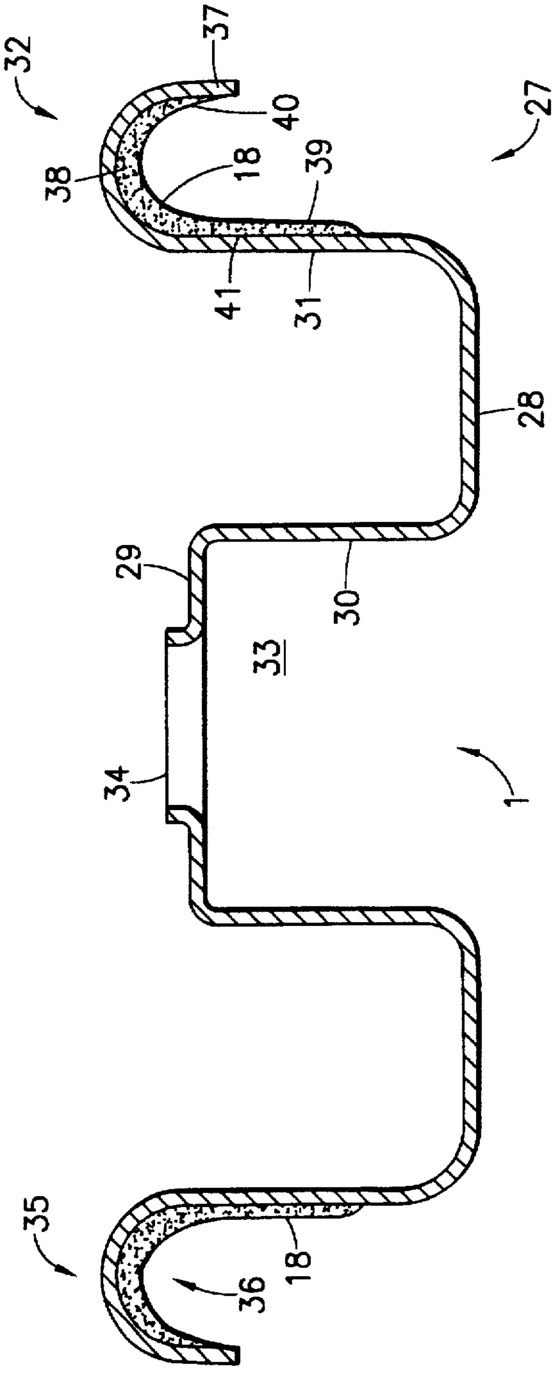
FIG. 6 is a cross-section drawing showing a mounting cup with a lining formed by a process according to an embodiment of the present invention.

Referring to FIG. 6, an embodiment of a lining cover (mounting cup) 27 comprises a metal cover 1 and a lining material layer 18. In this embodiment (mounting cup), metal cover 1 has a ring-shaped outerperimeter cavity 28 and a ring-shaped inner perimeter projection 29 bridged by an inner perimeter wall 30. An outer perimeter wall 31 extending upwardly from an outer perimeter of outer-perimeter cavity 28 extends into a curving flange 32. A valve storage area 33 is defined by ring-shaped inner-perimeter projection 29 and inner perimeter wall 30. A hole 34 is formed at the center of ring-shaped inner perimeter projection 29. Hole 34 accommodates a pipe used to convey contents of a container capped by lining cover 27.

Tightening flange 35 has a half oval radial cross-section which forms a groove 36, with a groove center 38, that opens downwardly. Lining material layer 18 of thermoplastic resin is formed in groove 36. In this embodiment, lining material layer 18 is thinnest at outer perimeter end rim 37 of tightening flange 35. Layer 18 is thickest in groove center 38. A portion of layer 18 extends beyond an inner perimeter of tightening flange 35 along outer perimeter wall 31. Thus, lining layer 18 has a radial crosssection forming a U-shape, with an inner side 39 that is longer than an outer side 40 .

Referring again to FIGS. 4 and 5, an inner diameter $D_i$ of ring 23 is somewhat larger than the outer diameter of outer perimeter wall 31 (FIG. 6) of base object (metal cover) 1. An outer diameter $D_o$ of ring 23 is somewhat smaller than the inner diameter of flange outer perimeter rim 37 (FIG. 6) of base object (metal cover) 1. This insures that ring 23 of molding member 11 can be inserted into flange groove 36 (FIG. 6) of base object (metal cover) 1. Referring to the drawing, in the molding member shown, asymmetrical V-shaped active tip 26 is biased somewhat toward the outer perimeter of groove center 38 of metal cover 1.

In the present embodiment, the incline angles of inner long side 24 and outer short side 25, β and τ, are not extremely different in magnitude. In the present embodiment, angle β between long side 24 and an axial line (a line defined by the rotational symmetry of active tip 26) of V-shaped tip 26 is somewhat greater than an angle gamma formed between the axial line and short side 25. These angles are important to the shaping properties and the thickness of the lining layer 18. If the incline angle is too large, it becomes difficult to adequately press in the molding member to the resinfilled layer, thus decreasing moldability. If the angle becomes too small, the molding member presses in too deeply into the resin-filled layer so that there tends to be decreased thickness at the groove center. Therefore, incline angles β and τ should generally be between 20 and 40 degrees. In the case of the present embodiment, it has been found that angles are ideally between 25 and 35 degrees.

Optimal dimensions for a working example of a molding member used for preparing the lining of a mounting cup with a diameter of 24 mm are as follows:

| | |
|---|---|
| inner diameter Di of ring | 24.5 mm |
| outer diameter Do of ring | 31.6 mm |
| diameter Dc of tip | 28.4 mm |
| angle (beta) of inner perimeter long side | 27.8 degrees |
| angle (gamma) of outer perimeter short side | 38.4 degrees |

A molding member with the above dimensions will press against the powder-filled layer adequately and form the prescribed lining shape. The load to be applied on the molding member varies according to the area of the resin-filled layer, but a pressure of between 5 and 70 kgf produces good results. In the case of the mounting cup in the embodiment above, a load of between 40 and 50 kgf is optimal.

While not always necessary, it is possible to heat the metal cover while the powder layer is being pressed by the molding member. This serves to prevent the molded powder lining layer from losing its shape completely when it is being transferred to the fusing process. If heat is applied with a high-frequency induction heating coil, it is possible to selectively heat, in a very short period of time, the areas where the prescribed lining is to be performed. Of course, the degree of applied heat should be such that powder does not adhere to the molding member and the powder is loosely fixed to the metal cover so that the powder does not crumble causing the shape of the powder layer to be lost. In general, a short heating interval of between 0.1 and 5 seconds and especially between 0.1 and 2 seconds is adequate. The high-frequency heating can be performed at a frequency of between 10 and 200 kHz, and the input to the coil should be between 1.0 and 10 kw per cover.

The cover, which has a molded resin powder layer, and which has been loosely fixed if necessary, is then heated so that the resin particles are fused integrally. This fusing procedure is performed at a temperature at or above a reference temperature T corresponding to the melting point or softening point of the resin. When the melting point of the resin is well-defined, the melting point should be used as the reference, and if the melting point is not well-defined, then the softening point of the resin should be used as the reference. Heating should be performed at a temperature of between T+5° C. and T+100°C., where T is the reference melting point or the softening point of the resin. Heating can be performed with a variety of methods, including the use of a hot-blast circulation furnace, the use of an infrared heating furnace, high-frequency inductance heating, inductance heating, and the like. After heating, the cover is cooled or left to cool, resulting in the lined cover of the present invention.

Figure 7C:
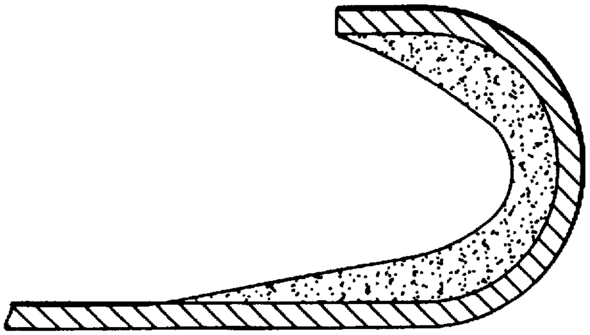
FIG. 7(C) is a radial section of a perimeter portion of the mounting cup of FIG. 6 formed with a third amount of lining material.
Figure 7B:
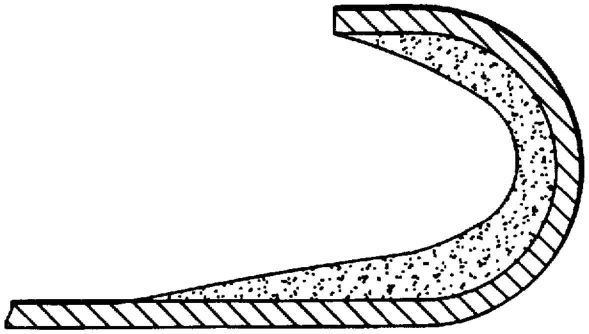
FIG. 7(B) is a radial section of a perimeter portion of the mounting cup of FIG. 6 formed with a second amount of lining material.
Figure 7A:
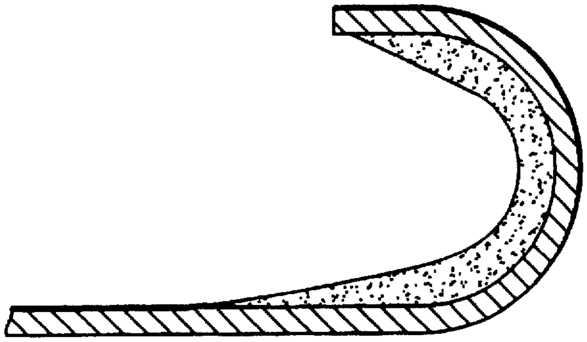
FIG. 7(A) i s a radial section of a perimeter portion of the mounting cup of FIG. 6 formed with a first amount of lining material.

Referring to FIGS. 7(A), 7(B), and 7(C), enlarged cross-sections diagram of tightening flanges with lining produced in the manner described above have varying radial cross-sections. Low-density polyethylene (LDPE) with irregularly shaped particles was applied to a 24 mm diameter mounting cup. The low-density polyethylene has a density of 0.925 $g/cm^3$, a melt-flow rate of 22 g/10 min, and an average particle diameter of 150 μm. To produce the various profiles shown in FIGS. 7(A), 7(B), and 7(C), the mass of powder fed was varied. The profile of FIG. 7(A) was formed with a powder mass of 0.25 g. The profile of FIG. 7(B) was formed with a powder mass of 0.3 g. The profile of FIG. 7(C) was formed with a powder mass of 0.35 g. Pressure was applied with the molding tool shown in FIGS. 4 and 5, and the lining was loosely fixed and subsequently fused as discussed above.

Melting and flowing of the resin causes the radial cross-section of the lining material surface to relax from more of a V-shape to more of a U-shape. The depth of the lining is thin at outer perimeter rim 37 and thickens toward groove center 38. The lining then thins again along a reference portion 41 of the inner perimeter flange, which is the outward facing surface opposite outer perimeter rim 37. The lining extends beyond reference portion 41 of the inner perimeter of the flange opposite outer perimeter rim 37 of the flange, and extends opposite from the groove. As may be appreciated by comparing FIGS. 7(A), 7(B), and 7(C), the amount of filled resin is increased, the lining layer at groove center 38 becomes thicker. The lining thickness at reference portion 41 of the inner perimeter of the flange becomes thicker as well. The length of the extension from inner perimeter reference portion 41 extends as the mass of lining material is increased.

In the current example, it is desirable for the depth of the lining to be between 100 and 1500 μm at the groove center. Optimally this depth should be between 300 and 1000 μm. The thickness of the lining at reference portion 41 of the inner perimeter of the flange should be between 10 and 500 μm, and optimally between 100 and 200 μm. The length of the extension from reference portion 41 of the flange inner perimeter should be between 0.1 and 4 mm, and optimally between 1 and 4 mm. Optimality being based on sealing and corrosion resistance properties for the tightening portion.

Besides the mounting cup described above, the base object used in the present invention can also include lining covers, mechanical parts, electronic parts, structural materials, furniture parts, construction materials and the like. These are generally formed through machine processing of metals such as press molding, drawing and extruding. Appropriate metals include surface treated steel such as tinplate and light metals such as aluminum. In terms of strength and corrosion resistance, surface treated steel is desirable. In particular, steel plates processed with electrolytic chromic acid are inexpensive and have good film adhesion and corrosion resistance. Other material that can be used include: nickel plated steel plates processed with chromate; steel plates plated with an alloy of chromateprocessed iron and tin; steel plates plated with an alloy of chromateprocessed tin and nickel; steel plates plated with an alloy of chromateprocessed iron, tin and nickel; and steel plates plated with chromateprocessed aluminum.

Both reflow tinplate and non-reflow tinplate are available as tinplate materials. Although the amount of plating of tin is not limited, the optimal amount is in the range between 1.12 and 11.2 $g/m^2$. Optimality is based on corrosion resistance and ease of processing.

It is desirable to settle the surface treated layer, such as a chromate processed layer, on the tin layer. It is also desirable to form an alloy layer of tin and iron between the tin plating layer and the steel base layer to enhance corrosion resistance.

The thickness of surface-processed steel plates used in aerosol cans should generally range between 0.15 to 0.50 mm with a thickness in the range of 0.18 to 0.40 mm being optimal. Optimality in this case is based on pressure. If the thickness is below the specified range, pressure resistance may be inadequate. If the thickness is above the above specified range, the container is too heavy to process easily.

Among light metals, "pure" aluminum and aluminum alloy plate can be used. Aluminum alloy plates have good corrosion resistance and are easily processed. Aluminum alloy plates used for aerosol cans have the following composition: Mn: 0.2 to 1.5 percent by weight; Mg: 0.8 to 5 percent by weight; Zn: 0.25 to 0.3 percent by weight; Cu: 0.15 to 0.25 percent by weight; with the remainder comprising Al. With these light metal plates, it is desirable to also have 20 to 300 mg/m$^2$ of chrome using metallic chrome conversion with chromic acid processing or chromic acid/phosphoric acid processing. In the case of light metal plates, a thickness of between 0.15 and 0.40 mm is desirable.

It is desirable to have a resin covering on the surface of the metallic base object in order to prevent corrosion of the metal. The protective film used for the present cans can be a conventional thermosetting resin paint used for the protection of metals. Examples include phenol formaldehyde resin, furan formaldehyde resin, xylene formaldehyde resin, ketone formaldehyde resin, urea formaldehyde resin, melamin formaldehyde resin, alkyd resin, unsaturated polyester resin, epoxy resin, bis-maleimid resin, triallylcyanurate resin, thermosetting acrylic resin, silicone resin, oil-based resin, and thermoplastic resin paint, e.g., vinyl chloride-vinyl acetate copolymer, vinyl chloride-maleic acid copolymer, vinylchloride-maleic acidvinyl acetate copolymer, acrylic polymer, saturated polyester resin. These resin paints can be used singly or in combinations of two or more.

A thermoplastic resin film can be used as the resin covering, and this film can be laminated on a metal plate to be used for production of the base object. A biaxially stretched PET film can be used. Homopolyester composed solely of ethylene telephthalate units can be used as well as modified PET film containing small amounts of modified esther reverse units. The molecular weight of the PET should be within a range that allows film formation. The intrinsic viscocity $\eta$ should be 0.7 or greater.

The film at the area to be lined should adhere to the lining material, and in particular, should permit thermal adhesion. For this reason, it would be desirable for the paint to contain, at least at the areas of the metal base object on which lining is to be performed, an acid denatured olefin resin such as anhydrous maleic acid denatured olefin resin or a denatured olefin resin having a polar group such as polyethylene oxide. It would be desirable for there to be 0.1 to 10 percent by weight of denatured olefin resin per solid portion of paint.

In the present invention, a thermoplastic resin powder is generally used as the lining material for the sealing area. The thermoplastic resin used for the lining must be capable of being applied as a powder to the cover, and formed into a shape needed for sealing the cover and providing the necessary cushioning properties and resiliency. Thus, a resilient thermoplastic resin having a relatively low melting point or softening point is desirable. It would be desirable to use one of the following olefinic resins or a blend of the following resins: olefin resins such as low-, linear low-, medium- or high-density polyethylene, isotactic polypropylene, propyleneethylene copolymer, polybutene-1, ethylene-propylene copolymer, polybutene-1, ethylene-butene-1 copolymer, propylene-butene-1 copolymer, propylene-butene-1 copolymer, ethylene-propylene-butene-1 copolymer, ethylene-vinyl acetic acid copolymer, ion cross-link olefin copolymer (ionomer).

The olefin resins above can be blended with other elastomers such as: ethylene-propylene copolymer rubber, ethylene-propylene-diene copolymer rubber, SBR, NBR, thermoplastic elastomer.

An especially desirable resin for lining material is low-density polyethylene (LDPE). LDPE having a density of between 0.9 and 1.0 g/cm$^3$, and a melt-flow rate of between 10 and 30 g/10 min would be especially desirable.

LDPE has good resilience and cushioning properties, as well as a low melting point, which allows loose fixing and fusing at relatively low temperatures. LDPE also allows easy molding. The low melting point prevents heat damage to the film. When the sealing portion is formed, there is minimal creeping at room temperature, preventing leaks.

Of course, the powder used in the present invention is not restricted to the thermoplastic resins described above. For example, other thermoplastic resins such as fluoride resins can be used. These include polytetrafluoroethylene, tetrafluoroethylene-tetrafluoropropylene copolymer, vinyl polyfluoride, polyfluoride vinylidene. These resins are suited for forming solid lubricating layers on the base object which are wear resistant and which have low friction coefficients. They can also be used for forming high dielectric layers. The material used in forming the solid lubricating layers is not restricted to the above and can comprise solid lubricating agent powder which can be melted and sintered, as well as compounds of this kind of powder with a resin binder. These can also be used for thermoplastic resins and thermosetting resin lining that have good mechanical properties and heat resistance.

The powder can generally have any particle diameter, but based on the thick lining layer having a thickness within the range described above, it would be desirable for the powder to have an average particle diameter (measured with a microscope) of between 50 and 300 µm. In particular, relatively large particles with diameters in the range of between 100 and 200 fm would be especially desirable. The shape of the powder particles can be irregular, spherical, or dice shaped. However, in terms of moldability, irregularly shaped particles are desirable.

A known compounding agent can be added if necessary to the resin powder described above. For example, the following can be added according to known methods: filling agents, reinforcing agents, anti-static agents, anti-oxidizing agents, lubricating agents, ultraviolet light absorbing agents, and the like.

The following is a description of the embodiments of the present invention.

TEST EXAMPLE 1

The method of the present invention was used to line a flange of a mounting cup for aerosol cans. The lining was made with a non-spherical polyethylene powder (LDPE, average powder diameter of 150 micrometers, resting angle of 60 degrees) which had been mechanically pulverized.

A vibration (6 Hz, 2 mm amplitude) was applied via a cam rotated by a motor to an aluminum feed nozzle (2.5 mm diameter orifice, 50 degree taper angle, 10 mm long cylindrical portion). The vibration was applied downwardly from the upper portion of the nozzle for four seconds. The feed nozzle was positioned above the flange portion of the mounting cup, and the mounting cup was rotated at 60 rpm. The feed amount at this time was 0.3 g. Referring to FIG. 5, a pressure (48 kgf) was applied with a pressing tool while a high-frequency inductance heating device (1.2 kw output, 2 seconds) was used to heat the flange portion and loosely fix the powder. Then, an oven (160° C., 5 minutes) was used to fuse the powder to produce the lining. The mounting cup was embedded in epoxy resin and the cross-section was observed. The observation reveals that a good lining layer was formed. Hair spray stock solution, with dimethylether as a propellant, was filled with the standard method. The mounting cup and a domed top was clinched, and 100 cans of aerosol cans were produced. All the cans showed the prescribed characteristics and no leakage was observed.

TEST EXAMPLE 2

A second test example was formed as in example 1, using a non-spherical polyethylene powder (LDPE, 150 micrometers average particle diameter, 60 degree resting angle). Intermittent feeding with a vibration time of four seconds was performed on 100 mounting cups. This resulted in a constant feeding amount with a distribution of 0.3 +/−0.002 g.

TEST EXAMPLE 3

A third example was formed as in example 1, using a non-spherical polyethylene powder (LDPE, 150 micrometers average particle diameter, 60 degree resting angle). The feed nozzle was vibrated (6 Hz, 1 mm amplitude) by a cam rotated by a motor. The vibration was applied to the side surface of the feed nozzle so that the direction of vibration was horizontal. The feeding was performed on 100 mounting cups. The distribution of the feed amount for four seconds was 0.25 +/−0.01 g.

TEST EXAMPLE 4

Spherical polyethylene powder (LDPE, 180 micrometers average particle diameter, 20 degrees resting angle) was produced using chemical powder formation methods. Lining formation was attempted using the same method as in Test Example 1. With this method, the powder put in the feed nozzle did not stay in the feed nozzle and flowed out. Thus, the feed amount could not be controlled, and lining could not formed on prescribed areas.

TEST EXAMPLE 5

A powder (polyethylene pellets) having an average particle diameter of 1500 micrometers was used, and lining formation was attempted using the same method as in Test Example 1. While the powder fell, it would get clogged in the feed nozzle, so it was not possible to control the feed amount. Thus, lining could not be formed in defined areas.

In the present invention, a non-spherical powder having a resting angle of 40 degrees or more is used. The powder is made fluid with vibration so that a powder layer can be formed at a prescribed area on a base object. The powder layer is pressed with a molding member to form a lining layer having a prescribed shape. Thus, powder is applied exclusively to a prescribed area on a base object such as a cover. The resulting lining can be seamed and tightened effectively and has good sealing and corrosion resistance properties. The lining can be formed efficiently without generating environmental pollution, dispersion of powder, and the like.

Although in the embodiments described above, powder is held in a container and fed through a funnel outlet, the invention may be applied to an open vibrating conveyor such as a trough-shaped or flat surface having a portion inclined with respect to gravity. The surface of the conveyor could be vibrated and the powder guided to predefined portions of the target object by a shape of the surface, integral or connected guides, or by some other means. At least some of the accompanying claims are intended to encompass such embodiments.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A lining method for lining a predefined surface area on a base object, comprising:

providing a lining material in the form a non-spherical powder with a resting angle of 40 degrees or greater;

holding said powder in a container having a feed outlet;

vibrating at least one of said feed outlet and said container at a frequency and amplitude such that said powder flows by gravity through said feed outlet thereby feeding said powder;

feeding at least a portion of said powder stored in said container onto said predefined surface area on said base object; and fixing said powder fed onto said predefined area on said base object to form a lining.

2. A method as in claim 1 wherein said powder is an irregularly shaped thermoplastic resin powder.

3. A method as in claim 2, wherein said base object is an aerosol container mounting cup and said predefined surface area is an interface area between said mounting cup and a cylindrical wall of an aerosol container, said lining being effective to seal said mounting cup with said container wall.

4. A method as in claim 2, wherein said step of feeding at least a portion is effective to feed a predefined quantity of said powder.

5. A method as in claim 4, wherein said step of feeding at least a portion includes starting said vibrating of said at least one of said feed outlet and said container at the beginning of a predetermined interval and stopping said vibrating at an end of said predetermined interval.

6. A method as in claim 2, wherein said powder has a particle diameter of between 50 and 1000 μm.

7. A method as in claim 2, wherein:

said step of holding includes holding said powder in a container having a funnel-shaped inner surface and a feed outlet connected to a cylindrical nozzle communicating with said container, said cylindrical nozzle being between 2 and 40 times a diameter of said powder particles; and said step of providing includes providing a powder characterized by an incline angle between 30 and 70 degrees.

8. A method as in claim 2, wherein said step of vibrating includes vibrating said at least one of said container and said outlet at a frequency of between 5 and 1000 Hz with an amplitude of between 0.01 and 3 mm.

9. A method as in claim 2, wherein:

said step of feeding includes feeding said powder in a downward direction;

said downward direction is defined by a direction of gravitational acceleration; and said step of vibrating includes vibrating said one of said container and said feed outlet with a direction of oscillation that is substantially the same as said downward direction.

10. A method as in claim 2, wherein:

said base object is a metal cover having a tightening flange;

said powder is a thermoplastic resin powder; and said thermoplastic resin powder is applied to a groove in said tightening flange.

11. A method as in claim 1, wherein said object is an aerosol container mounting cup and said predefined surface area is an interface area between said mounting cup and a cylindrical wall of an aerosol container, said lining being effective to seal said mounting cup with said container wall.

12. A method as in claim 1, wherein said step of feeding at least a portion is effective to feed a predefined quantity of said powder.

13. A method as in claim 12, wherein said step of feeding at least a portion includes starting said vibrating of said at least one of said feed outlet and said container at the beginning of a predetermined interval and stopping said vibrating at an end of said predetermined interval.

14. A method as in claim 12, wherein said powder has a particle diameter of between 50 and 1000 μm.

15. A method as in claim 12, wherein:

said step of holding includes holding said powder in a container having a funnel-shaped inner surface and a feed outlet connected to a cylindrical nozzle communicating with said container, said cylindrical nozzle being between 2 and 40 times a diameter of said powder particles; and said step of providing includes providing a powder characterized by an incline angle between 30 and 70 degrees.

16. A method as in claim 12, wherein said step of vibrating includes vibrating said at least one of said container and said outlet at a frequency of between 5 and 1000 Hz with an amplitude of between 0.01 and 3 mm.

17. A method as in claim 12, wherein:

said step of feeding includes feeding said powder in a downward direction;

said downward direction is defined by a direction of gravitational acceleration; and said step of vibrating includes vibrating said one of said container and said feed outlet with a direction of oscillation that is substantially the same as said downward direction.

18. A method as in claim 12, wherein:

said base object is a metal cover having a tightening flange;

said powder is a thermoplastic resin powder; and said thermoplastic resin powder is applied to a groove in said tightening flange.

19. A method as in claim 1, wherein said step of feeding at least a portion includes starting said vibrating of said at least one of said feed outlet and said container at the beginning of a predetermined interval and stopping said vibrating at an end of said predetermined interval.

20. A method as in claim 19, wherein said powder has a particle diameter of between 50 and 1000 μm.

21. A method as in claim 19, wherein:

said step of holding includes holding said powder in a container having a funnel-shaped inner surface and a feed outlet connected to a cylindrical nozzle communicating with said container, said cylindrical nozzle being between 2 and 40 times a diameter of said powder particles; and said step of providing includes providing a powder characterized by an incline angle between 30 and 70 degrees.

22. A method as in claim 21, wherein said step of vibrating includes vibrating said at least one of said container and said outlet at a frequency of between 5 and 1000 Hz with an amplitude of between 0.01 and 3 mm.

23. A method as in claim 21, wherein:

said step of feeding includes feeding said powder in a downward direction;

said downward direction is defined by a direction of gravitational acceleration; and said step of vibrating includes vibrating said one of said container and said feed outlet with a direction of oscillation that is substantially the same as said downward direction.

24. A method as in claim 21, wherein:

said base object is a metal cover having a tightening flange;

said powder is a thermoplastic resin powder; and said thermoplastic resin powder is applied to a groove in said tightening flange.

25. A method as in claim 1, wherein said powder has a particle diameter of between 50 and 1000 μm.

26. A method as in claim 25, wherein:

said step of holding includes holding said powder in a container having a funnel-shaped inner surface and a feed outlet connected to a cylindrical nozzle communicating with said container, said cylindrical nozzle being between 2 and 40 times a diameter of said powder particles; and said step of providing includes providing a powder characterized by an incline angle between 30 and 70 degrees.

27. A method as in claim 25, wherein said step of vibrating includes vibrating said at least one of said container and said outlet at a frequency of between 5 and 1000 Hz with an amplitude of between 0.01 and 3 mm.

28. A method as in claim 25, wherein:

said step of feeding includes feeding said powder in a downward direction;

said downward direction is defined by a direction of gravitational acceleration; and said step of vibrating includes vibrating said one of said container and said feed outlet with a direction of oscillation that is substantially the same as said downward direction.

29. A method as in claim 25, wherein:

said base object is a metal cover having a tightening flange;

said powder is a thermoplastic resin powder; and said thermoplastic resin powder is applied to a groove in said tightening flange.

30. A method as in claim 1, wherein:

said step of holding includes holding said powder in a container having a funnel-shaped inner surface and a feed outlet connected to a cylindrical nozzle communicating with said container, said cylindrical nozzle being between 2 and 40 times a diameter of said powder particles; and said step of providing includes providing a powder characterized by an incline angle between 30 and 70 degrees.

31. A method as in claim 30, wherein said step of vibrating includes vibrating said at least one of said container and said outlet at a frequency of between 5 and 1000 Hz with an amplitude of between 0.01 and 3 mm.

32. A method as in claim 30, wherein:

said step of feeding includes feeding said powder in a downward direction;

said downward direction is defined by a direction of gravitational acceleration; and said step of vibrating includes vibrating said one of said container and said feed outlet with a direction of oscillation that is substantially the same as said downward direction.

33. A method as in claim 30, wherein:

said base object is a metal cover having a tightening flange;

said powder is a thermoplastic resin powder; and said thermoplastic resin powder is applied to a groove in said tightening flange.

34. A method as in claim 1, wherein said step of vibrating includes vibrating said at least one of said container and said outlet at a frequency of between 5 and 1000 Hz with an amplitude of between 0.01 and 3 mm.

35. A method as in claim 34, wherein:

said step of feeding includes feeding said powder in a downward direction;

said downward direction is defined by a direction of gravitational acceleration; and said step of vibrating includes vibrating said one of said container and said feed outlet with a direction of oscillation that is substantially the same as said downward direction.

36. A method as in claim 34, wherein:

said base object is a metal cover having a tightening flange;

said powder is a thermoplastic resin powder; and said thermoplastic resin powder is applied to a groove in said tightening flange.

37. A method as in claim 1, wherein:

said step of feeding includes feeding said powder in a downward direction;

said downward direction is defined by a direction of gravitational acceleration; and said step of vibrating includes vibrating said one of said container and said feed outlet with a direction of oscillation that is substantially the same as said downward direction.

38. A method as in claim 37, wherein:

said base object is a metal cover having a tightening flange;

said powder is a thermoplastic resin powder; and said thermoplastic resin powder is applied to a groove in said tightening flange.

39. A lining method for lining a predefined surface area on a base object, comprising:

providing a lining material in the form a non-spherical powder with a resting angle of 40 degrees or greater;

providing a conveyor with a surface having a portion that is oblique to both a direction of gravitational force and a direction perpendicular to said direction of gravitational force;

supplying said powder onto said surface of said conveyor;

vibrating said surface of said conveyor sufficiently to fluidize said powder such that said powder moves toward a feed outlet portion of said conveyor;

feeding said powder onto said predefined surface area on said base object; and fixing said powder fed onto said predefined area on said base object to form a lining.

40. A method as in claim 39 wherein said powder is an irregularly shaped thermoplastic resin powder.

41. A method as in claim 40, wherein said object is an aerosol container mounting cup and said predefined surface area is an interface area between said mounting cup and a cylindrical wall of an aerosol container, said lining being effective to seal said mounting cup with said container wall.

42. A method as in claim 40, wherein said step of feeding includes feeding a predefined fixed quantity of said powder.

43. A method as in claim 42, wherein said step of feeding a predefined fixed quantity includes starting said vibrating at a beginning of a predetermined interval and stopping said vibrating at an end of said predetermined interval.

44. A method as in claim 40, wherein said powder has a particle diameter of between 50 and 1000 μm.

45. A method as in claim 40, wherein:

said step of providing a conveyor includes providing said conveyor with said surface having a funnel-shape and a cylindrical nozzle portion between 2 and 40 times a diameter of said powder particles; and said step of providing includes providing a powder characterized by an incline angle between 30 and 70 degrees.

46. A method as in claim 40, wherein said step of vibrating includes vibrating said surface at a frequency of between 5 and 1000 Hz with an amplitude of between 0.01 and 3 mm.

47. A lining method as in claim 40, wherein:

said step of feeding includes feeding said powder in a downward direction;

said downward direction being defined by a direction of gravitational acceleration; and said step of vibrating includes vibrating said surface in a direction of oscillation that is substantially the same as said downward direction.

48. A method as in claim 40, wherein:

said base object is a metal cover having a tightening flange;

said powder is a thermoplastic resin powder; and said thermoplastic resin powder is applied to a groove in said tightening flange.

49. A method as in claim 39, wherein said object is an aerosol container mounting cup and said predefined surface area is an interface area between said mounting cup and a cylindrical wall of an aerosol container, said lining being effective to seal said mounting cup with said container wall.

50. A method as in claim 49, wherein said step of feeding includes feeding a predefined fixed quantity of said powder.

51. A method as in claim 50, wherein said step of feeding a predefined fixed quantity includes starting said vibrating at a beginning of a predetermined interval and stopping said vibrating at an end of said predetermined interval.

52. A method as in claim 49, wherein said powder has a particle diameter of between 50 and 1000 μm.

53. A method as in claim 49, wherein:

said step of providing a conveyor includes providing said conveyor with said surface having a funnel-shape and a cylindrical nozzle portion between 2 and 40 times a diameter of said powder particles; and said step of providing includes providing a powder characterized by an incline angle between 30 and 70 degrees.

54. A method as in claim 49, wherein said step of vibrating includes vibrating said surface at a frequency of between 5 and 1000 Hz with an amplitude of between 0.01 and 3 mm.

55. A lining method as in claim 49, wherein:

said step of feeding includes feeding said powder in a downward direction;

said downward direction being defined by a direction of gravitational acceleration; and said step of vibrating includes vibrating said surface in a direction of oscillation that is substantially the same as said downward direction.

56. A method as in claim 49, wherein:

said base object is a metal cover having a tightening flange;

said powder is a thermoplastic resin powder; and said thermoplastic resin powder is applied to a groove in said tightening flange.

57. A method as in claim 39, wherein said step of feeding includes feeding a predefined fixed quantity of said powder.

58. A method as in claim 57, wherein said step of feeding a predefined fixed quantity includes starting said vibrating at a beginning of a predetermined interval and stopping said vibrating at an end of said predetermined interval.

59. A method as in claim 57, wherein said powder has a particle diameter of between 50 and 1000 μm.

60. A method as in claim 57, wherein:

said step of providing a conveyor includes providing said conveyor with said surface having a funnel-shape and a cylindrical nozzle portion between 2 and 40 times a diameter of said powder particles; and said step of providing includes providing a powder characterized by an incline angle between 30 and 70 degrees.

61. A method as in claim 57, wherein said step of vibrating includes vibrating said surface at a frequency of between 5 and 1000 Hz with an amplitude of between 0.01 and 3 mm.

62. A method as in claim 57, wherein:

said step of feeding includes feeding said powder in a downward direction;

said downward direction being defined by a direction of gravitational acceleration; and said step of vibrating includes vibrating said surface in a direction of oscillation that is substantially the same as said downward direction.

63. A method as in claim 57, wherein:

said base object is a metal cover having a tightening flange;

said powder is a thermoplastic resin powder; and said thermoplastic resin powder is applied to a groove in said tightening flange.

64. A method as in claim 39, wherein said powder has a particle diameter of between 50 and 1000 μm.

65. A method as in claim 64 wherein said powder is an irregularly shaped thermoplastic resin powder.

66. A method as in claim 64, wherein:

said step of providing a conveyor includes providing said conveyor with said surface having a funnel-shape and a cylindrical nozzle portion between 2 and 40 times a diameter of said powder particles; and said step of providing includes providing a powder characterized by an incline angle between 30 and 70 degrees.

67. A method as in claim 64, wherein said step of vibrating includes vibrating said surface at a frequency of between 5 and 1000 Hz with an amplitude of between 0.01 and 3 mm.

68. A method as in claim 64, wherein:

said step of feeding includes feeding said powder in a downward direction;

said downward direction being defined by a direction of gravitational acceleration; and said step of vibrating includes vibrating said surface in a direction of oscillation that is substantially the same as said downward direction.

69. A method as in claim 64, wherein:

said base object is a metal cover having a tightening flange;

said powder is a thermoplastic resin powder; and said thermoplastic resin powder is applied to a groove in said tightening flange.

70. A method as in claim 39, wherein:

said step of providing a conveyor includes providing said conveyor with said surface having a funnel-shape and a cylindrical nozzle portion between 2 and 40 times a diameter of said powder particles; and said step of providing includes providing a powder characterized by an incline angle between 30 and 70 degrees.

71. A method as in claim 70, wherein said step of vibrating includes vibrating said surface at a frequency of between 5 and 1000 Hz with an amplitude of between 0.01 and 3 mm.

72. A method as in claim 70, wherein:

said step of feeding includes feeding said powder in a downward direction;

said downward direction being defined by a direction of gravitational acceleration; and said step of vibrating includes vibrating said surface in a direction of oscillation that is substantially the same as said downward direction.

73. A method as in claim 70, wherein:

said base object is a metal cover having a tightening flange;

said powder is a thermoplastic resin powder; and said thermoplastic resin powder is applied to a groove in said tightening flange.

74. A method as in claim 39, wherein said step of vibrating includes vibrating said surface at a frequency of between 5 and 1000 Hz with an amplitude of between 0.01 and 3 mm.

75. A method as in claim 74, wherein:

said step of feeding includes feeding said powder in a downward direction;

said downward direction being defined by a direction of gravitational acceleration; and said step of vibrating includes vibrating said surface in a direction of oscillation that is substantially the same as said downward direction.

76. A method as in claim 74, wherein:

said base object is a metal cover having a tightening flange;

said powder is a thermoplastic resin powder; and said thermoplastic resin powder is applied to a groove in said tightening flange.

77. A method as in claim 39, wherein:

said step of feeding includes feeding said powder in a downward direction;

said downward direction being defined by a direction of gravitational acceleration; and said step of vibrating includes vibrating said surface in a direction of oscillation that is substantially the same as said downward direction.

78. A method as in claim 77, wherein:

said base object is a metal cover having a tightening flange;

said powder is a thermoplastic resin powder; and said thermoplastic resin powder is applied to a groove in said tightening flange.

79. A method as in claim 39, wherein:

said base object is a metal cover having a tightening flange;

said powder is a thermoplastic resin powder; and said thermoplastic resin powder is applied to a groove in said tightening flange.

80. A method as in claim 39, further comprising molding said powder fed onto said predefined area simultaneously with said fixing to form a lining with a surface shaped by said molding.

81. A method as in claim 80, wherein said step of fixing includes heat fixing said powder.

82. A method as in claim 39, wherein said step of fixing includes heat fixing said powder.

83. A lining method for lining a predefined surface area on a base object, comprising:

providing a lining material in the form a non-spherical powder with a resting angle of 40 degrees or greater;

providing a conveyor with a surface having a portion that is oblique to both a direction of gravitational force and a direction perpendicular to said direction of gravitational force;

supplying said powder onto said surface of said conveyor;

vibrating said surface of said conveyor sufficiently to fluidize said powder such that said powder moves toward a feed outlet portion of said conveyor;

guiding said powder moving toward said feed outlet to a portion of said conveyor surface shaped to limit a spread of said powder fed from said surface beyond said predefined area, whereby said powder is fed onto said predefined surface area on said base object; and fixing said powder fed onto said predefined area on said base object to form a lining.

84. A lining method for lining a predefined surface area on a base object, comprising:

providing a lining material in the form a non-spherical powder with a resting angle of 40 degrees or greater;

providing a conveyor with a surface having a portion that is oblique to both a direction of gravitational force and a direction perpendicular to said direction of gravitational force;

supplying said powder onto said surface of said conveyor;

vibrating said surface of said conveyor sufficiently to fluidize said powder such that said powder moves toward a feed outlet portion of said conveyor;

guiding said powder moving toward said feed outlet to a portion of said conveyor surface shaped to limit a spread of said powder fed from said surface beyond said predefined area, whereby said powder is fed onto said predefined surface area on said base object; and heat-fixing and simultaneously molding said powder fed onto said predefined area on said base object to form a lining with a surface shaped by said molding.

* * * * *